(12) United States Patent
Awad

(10) Patent No.: US 6,752,181 B1
(45) Date of Patent: Jun. 22, 2004

(54) AUTOMOTIVE TRANSMISSION FLUID EXCHANGE SYSTEM AND METHOD OF USE

(76) Inventor: Adam Awad, 160 Fairhaven La., Costa Mesa, CA (US) 92626

( * ) Notice: Subject to any disclaimer, the term of this patent is extended or adjusted under 35 U.S.C. 154(b) by 13 days.

(21) Appl. No.: 10/634,976

(22) Filed: Aug. 4, 2003

(51) Int. Cl.[7] .............................. B65B 1/04; B65B 3/04; B67C 3/02
(52) U.S. Cl. ................................ 141/98; 141/1; 141/8; 141/65; 141/67; 184/1.5
(58) Field of Search .............................. 141/1, 4, 6, 8, 141/59, 65, 67, 82, 94, 98; 73/53.07; 184/1.5, 105.1; 123/196 R

(56) References Cited

U.S. PATENT DOCUMENTS

| | | | | |
|---|---|---|---|---|
| 4,807,674 A | * | 2/1989 | Sweet | 141/59 |
| 4,976,235 A | * | 12/1990 | Commanday | 123/196 R |
| 5,427,202 A | * | 6/1995 | Behring et al. | 184/1.5 |
| 5,472,064 A | * | 12/1995 | Viken | 184/1.5 |

* cited by examiner

Primary Examiner—Timothy L. Maust
(74) Attorney, Agent, or Firm—Gene Scott-Patent Law & Venture Group

(57) ABSTRACT

A spent transmission fluid is drained from a transmission and replaced with new fluid. The transmission's converter forces the spent fluid into a spent fluid container, while air displaced by the entering spent fluid is forced into a second container holding a new replacement fluid. The second container is thereby pressurized and the new fluid is thus forced through an interconnecting conduit line into the dipstick tube so as to replace the spent fluid flowing out. The spent fluid leaving the transmission causes suction to appear at the dipstick tube which sucks the new fluid into the transmission. To assure that this suction is maintained, the dipstick tube is sealed so that the system is closed.

17 Claims, 1 Drawing Sheet

AUTOMOTIVE TRANSMISSION FLUID EXCHANGE SYSTEM AND METHOD OF USE

BACKGROUND OF THE INVENTION

1. Field of the Invention

This invention relates generally to automotive fluid systems and methods of use and more particularly to a transmission fluid exchange system and method of use.

2. Description of Related Art

The following art defines the present state of this field:

Allen, U.S. Pat. No. 4,408,960 describes a pneumatic method and apparatus for causing the rapid recirculation of a liquid between a plurality of containers by adjusting the pressure of a gas exerted within each of said containers to super-atmospheric, atmospheric and sub-atmospheric pressures, thereby avoiding the passing of the liquid through a mechanical flow-inducing pump. The containers are connected to each other by means of a liquid circulation system comprising a circulation conduit which includes a work station. A filled fist container is subjected to super-atmospheric pressure to force the liquid into the circulation system while a second empty container is subjected to sub-atmospheric pressure to suck the liquid from the circulation system. After each container is empty and before it is subjected to sub-atmospheric pressure, for refilling purposes, it is exposed to atmospheric pressure to release the elevated pressure therefrom. The circulation system preferably incorporates a bypass conduit including a liquid replenishment tank and/or means for adjusting the temperature of the liquid.

Viken, U.S. Pat. No. 5,318,080 describes fluid changing in an automatic transmission by opening the cooler line and draining used fluid, at the flow of normal circulation, out of the cooler line from the transmission into a drain receptacle for receiving used fluid and simultaneously supplying fresh fluid, from a pressurized supply receptacle, into the cooler return line to the transmission at a similar controlled rate that is equal or greater than the rate of flow of the used fluid into the drain receptacle.

Knorr, U.S. Pat. No. 5,415,247 describes an automotive fluid exchange system wherein new fluid (such as power steering fluid) is simultaneously exchanged with the used fluid. First and second fluid conduits having first and second pumps disposed therein, respectively, provide the passageway between an engine compartment and a container for the new and used fluid, respectively. The two pumps are selectively actuatable by a respective, conventional toggle switch. Conventional jumper cables provide the power supply means to drive the pumps.

Payne, U.S. Pat. No. 5,427,505 describes an apparatus for extracting and injecting liquid coolant from and into a reservoir for an engine cooling system. The apparatus includes a storage tank for the liquid coolant, and an air pressure system for selectively applying fluid pressure to the tank either above or below atmospheric pressure. A hose connects the tank to the engine cooling system reservoir through a double shut-off-type coupling. One part of the coupling is connected to the reservoir, and the other, to the end of the transfer hose each having its own independent shut-off valve. When the coupling is connected, the valves in both components are opened and conversely when the coupling is disconnected, the valves automatically close.

Taguchi, U.S. Pat. No. 5,520,518 describes a method of transferring fluent material transferring the material from a first pressure tank to a fluent material transfer destination by supplying compressed gas to the first tank through a compressor. The compressed gas is retained in the first tank for reuse. Additional fluent material is drawn into a second pressure tank and is transferred therefrom to the fluent material transfer destination by supplying the compressed gas from the first pressure tank to the second pressure tank through the compressor. The compressed gas is further retained in the second pressure tank transferring fluent material from the first pressure tank. As the compressed gas is emptied from each tank to the other tank, additional fluent material is drawn into that tank. The cycle can be repeated on a continuous basis to transfer large quantities of fluent material.

Evans, U.S. Pat. No. 5,738,499 describes a fluid delivery/extracting device for extracting fluid from and delivering fluid to a reservoir of a vehicle. The device includes a cylindrical body formed from a tube, a bottom member and a top member. The top member comprises an annular member and a closure which closes the annular member. A pair of fittings extending through the closure, one of which has a portion extending below the closures top surface. A dip tube is applied to the this fitting and extends nearly to the bottom of the container. A first hose extends from the first fitting outer portion to a reservoir to be filled or emptied and is sufficiently long to extend to the bottom of the reservoir. A second hose extends from the second fitting and is connectable to any vacuum port of a vehicle if the device is to be used to empty the reservoir, or to a supply of pressurized air, if the device is to be used to fill the reservoir. The device makes it fairly simple to extract fluid from and deliver fluid to even hard to reach reservoirs, and reservoirs which are filled with highly viscous fluids.

Dixon et al., U.S. Pat. No. 5,806,629 describes a fail-safe transmission service machine allowing old ATF to be pumped out of a transmission while the vehicle engine runs, and responsively pumps a matching volume of new ATF into the transmission so that dry running of the transmission can not occur. If the supply of new ATF runs out or if power to the service machine is interrupted, the machine reverts to closed loop fluid circulation for the transmission. A hydraulic rectifier provides for universal connection of hoses between the transmission cooler fluid circulation loop of the vehicle and the service machine. An alternative embodiment of the machine allows for similarly fail-safe exchange of power steering fluid from a vehicle, and replacement of the old fluid with new power steering fluid.

Dixon et al., U.S. Pat. No. 5,853,068 describes an automotive fluid service machine for changing fluids such as automatic transmission fluid, power steering fluid, and engine coolant, including a cabinet with a unitary integral fluid reservoir defined by a lower portion of the machine cabinet. This lower cabinet portion which integrally defines the fluid reservoir also provides a machinery deck to which the components of the machines are mounted. A cap portion of the cabinet provides a cavity for protecting the components mounted to the machinery deck and also provides a control panel for the machine in addition to providing fluid fill and drainage basins improving the convenience and safety of use for the machine. The safety of a service area is improved by the machine because a very low center of gravity for the machine reduces the risk of tipping of a machine and of spilling fluids. Thus, environmental concerns from such spills as well as the risk of personnel slips and falls on spilled fluids are reduced.

Dixon, U.S. Pat. No. 6,035,902 describes a fail-safe service machine for the power steering system of automotive vehicles including a pair of pumps each driven by electrical power from a vehicle under service, and a suction/delivery probe extending into the power steering system reservoir of the vehicle, both to remove old power steering fluid, and to simultaneously deliver new power steering fluid.

Rome et al., U.S. Pat. No. 6,062,275 describes an apparatus and method of replacing old fluid in a transmission system by feeding clean fluid into the system from a clean fluid tank using a pump and draining the old fluid into a waste tank and using a processor to monitor the clean fluid pressure in the clean tank and the old fluid pressure in the waste tank and adjusting the pump's speed using the processor such that the old fluid is drained at substantially the same rate as the clean fluid is fed.

Rome et al., U.S. Pat. No. 6,247,509 describes and apparatus and method of replacing old fluid in a transmission system by feeding clean fluid into the system from a clean fluid tank using a pump and draining the old fluid into a waste tank and using a processor to monitor the clean fluid pressure in the clean tank and the old fluid pressure in the waste tank and adjusting the pump's speed using the processor such that the old fluid is drained at substantially the same rate as the clean fluid is fed.

Evans, U.S. Pat. No. 6,286,626 describes an automated system for changing the motor oil in an engine. The system includes a drain plug having a plurality of channels coupled with tubing that extends to a reversible pump. Tubing extends from the pump to both a used oil container and a new oil container. Check valves positioned at the entrance of each container restrict flow so the oil can flow only to the used oil container and only flows from the new oil container. Preferably, both containers are located in the trunk of the vehicle for easy access. In use, the pump is engaged to draw the used motor oil from the engine into the used oil container. Next, the pump is reversed to draw fresh oil from the new oil container into the engine.

Viken, U.S. Pat. No. 6,378,657 describes fluid changing in an automatic transmission by opening the cooler line and draining used fluid, at the flow of normal circulation, out of the cooler line from the transmission into a drain receptacle for receiving used fluid and simultaneously supplying fresh fluid, from a pressurized supply receptacle into the cooler return line to the transmission at a similar controlled rate that is equal or greater than the rate of flow of the used fluid into the drain receptacle.

Betancourt et al., U.S. Pat. No. 6,382,271 describes an apparatus and method of replacing old fluid in a transmission system by feeding clean fluid into the system from a clean fluid tank using a pump and draining the old fluid into a waste tank and using a processor to monitor the clean fluid pressure in the clean tank and the old fluid pressure in the waste tank and adjusting the pump's speed using the processor such that the old fluid is drained at substantially the same rate as the clean fluid is fed.

The prior art teaches the use of transmission fluid replacement systems, but does not teach a system that may be installed into one of the coolant lines of the transmission without knowing direction of flow, and does not teach a closed and sealed system that forces new replacement fluid into the transmission by both suction from the draining spent fluid and by pressure of displaced air in a sealed spent fluid container. The present invention fulfills these needs and provides further related advantages as described in the following summary.

SUMMARY OF THE INVENTION

The present invention teaches certain benefits in construction and use which give rise to the objectives described below.

A spent transmission fluid is drained from a transmission and replaced with new fluid. The process occurs while the transmission is operating so that the transmission's converter forces the spent fluid into a spent fluid container, while air, displaced by the entering spent fluid, is forced into a second container holding a new replacement fluid. The second container is thereby pressurized and the new fluid is thus forced through an interconnecting conduit line into the dipstick tube of the transmission so as to replace the spent fluid flowing out. The spent fluid leaving the transmission causes suction to appear at the dipstick tube which sucks the new fluid into the transmission. To assure that this suction is maintained, the dipstick tube is sealed so that the system is closed allowing hands free operation. A flow directing device is used to assure proper fluid flow from the transmission or from the transmission's cooler.

A primary objective of the present invention is to provide an apparatus and method of use of such apparatus that provides advantages not taught by the prior art.

Another objective is to provide such an invention capable of moving fluids between containers and the transmission system in such a manner that no exterior pump, other than the transmission pump, is required.

A further objective is to provide such an invention capable of quick and easy change of transmission fluid without excessive skill or supervision.

A further objective is to provide such an invention capable of system self pressurization for replacing transmission fluid.

A still further objective is to provide such an invention wherein the spent transmission fluid may be taken directly from the transmission line or from a transmission fluid cooler line without the necessity for checking in which direction the fluid is flowing.

A still further objective is to provide such an invention capable of replacing transmission fluid without spills and other potential damage to the environment because it is a closed and sealed system.

A still further objective is to provide such an invention capable of replacing transmission fluid without the aid of an external pump.

A still further objective is to provide hands free operation so that the fluid is less likely to come into contact with an operators skin.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawing illustrates the present invention. In such drawing.

DETAILED DESCRIPTION OF THE INVENTION

The above described drawing figures illustrate the invention in at least one of its preferred embodiments, which is further defined in detail in the following description.

Figure 1:
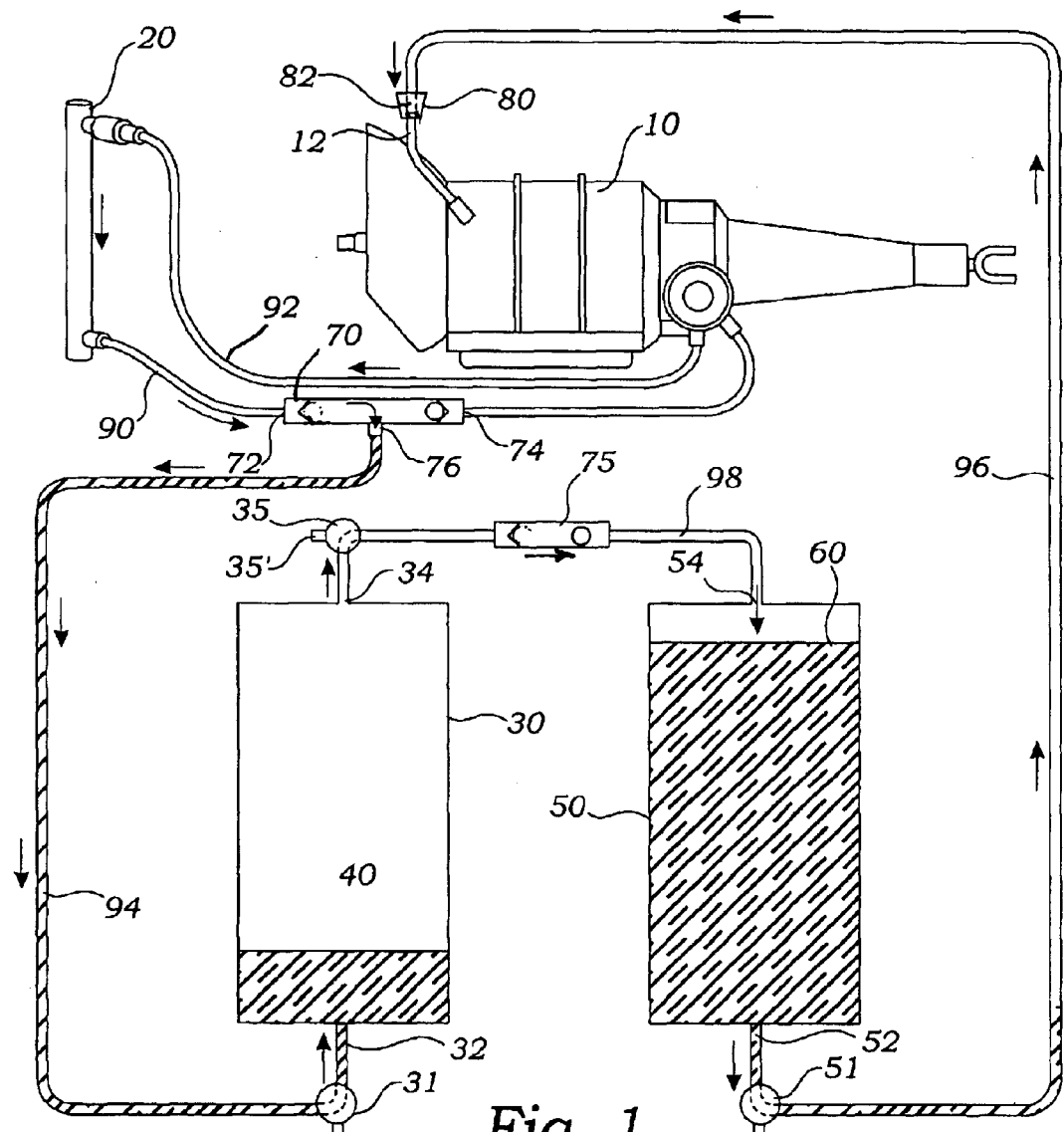
FIG. 1 is a schematic view of the preferred embodiment of the invention.
Figure 2:
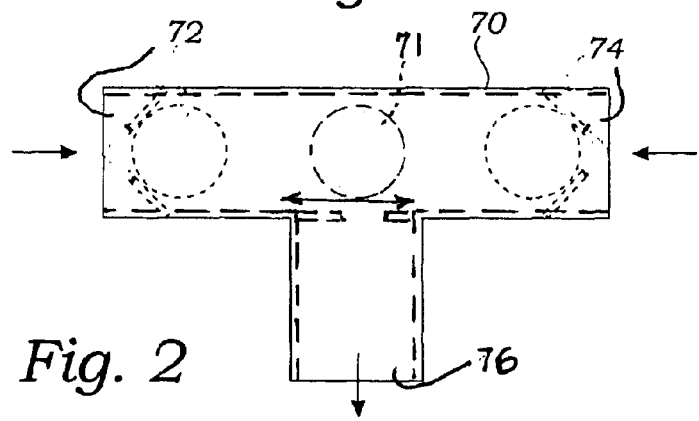
FIG. 2 is a schematic diagram of a flow directing means thereof used with an automotive transmission system.

The present invention is an apparatus for replacing transmission fluid in, for instance, an automotive vehicle such as a car, truck or bus, or in a stationary system such as a wind driven electricity generator. As shown in FIG. 1, a transmission 10 and a transmission fluid cooler 20 are interconnected for fluid exchange with a spent fluid container 30 for receiving a spent fluid 40 from the transmission 10 or from the cooler 20; and a new fluid container 50 which holds a new transmission fluid 60. It should be noticed that no external pump is required in the present apparatus and method. It should also be noticed that in FIG. 1, the spent fluid 40 is flowing to spent fluid container 30 from cooler 20. A means for directing fluid flow 70 provides two inlet orifices 72, 74 and an outlet orifice 76, as shown in FIG. 2. FIG. 2 shows, in schematic form, that fluid flow into either inlet orifice 72 or 74 pushes ball cock 71 in the direction of inflow to seal the opposing inlet. So as not to confuse the reader, ball cock 71 is shown in three positions; sealing inlet 72 at the left in FIG. 2, sealing inlet 74 at the right in FIG. 2, and in the center, a neutral position when no flow is present. Clearly, the ball cock is able to freely move between these positions depending on the direction of fluid inflow. In FIG. 1 it is shown that the flow directing means 70 is enabled for receiving fluid through inlet orifice 72 while discharging the fluid through the outlet orifice 76 to spent fluid line 94, and further, while checking fluid flow through the other of the inlet orifices 74. Flow through both of the inlet orifices 72, 74 is not possible in that flow through one of the orifices closes the other as can be seen in the schematic FIG. 2 and discussed above. It should be recognized that the flow directing means 70 may alternately be placed into transmission output line 92, which is normally used to conduct the transmission fluid to the cooler 20 as shown in FIG. 1. In this case, the spent fluid enters flow directing means 70 through inlet orifice 74 and exits from outlet orifice 76 to spent fluid line 94. Also, in this case, the line 90 (cooler return line) remains intact between cooler 20 and transmission 10. Flow directing means 70 receives spent fluid 40 and directs it to spent fluid line 94, so that without knowing the direction of flow in the lines 90 and 92, either line may be selected for use. This provides a significant advantage in the installation of the present apparatus in time saving and possible spills upon checking for fluid flow which is not necessary through the use of means 70.

A means for sealing 80 is provided within a dipstick tube 12 of the transmission 10, the sealing means providing a sealing means aperture 82 therethrough, enabling fluid flow through the sealing means 80. Such a sealing means 80 may be a modified rubber tube cork or stopper as is well known in chemistry laboratories. A cooler return line 90 and a transmission return line 92 each are interconnected with one of the inlet orifices 72, 74 of the flow directing means 70. A spent fluid line 94 is interconnected between the outlet orifice 76 of the flow directing means 70 and the spent fluid container 30. A new fluid line 96 is interconnected between the new fluid container 50 and the sealing means 80. A transfer fluid line 98 is interconnected between the spent 30 and the new 50 fluid containers. In this manner, the spent fluid 40 directly from the transmission 10 or from the fluid cooler flows to the flow directing means 70 and therefrom to the spent fluid container 30, thereby forcing air from the spent fluid container 30 into the new fluid container 50 through the transfer line 98, and thereby forcing the new fluid 60 from the new fluid container 50 directly into the transmission 10 via the new fluid line 96 through the sealing means 80. Suction from the transmission 10 at the sealing means 80 further urges the new fluid 60 into the dipstick tube 12 and thus into the transmission 10. The lines used herein are preferably flexible tube stock of a material impervious to transmission fluid. The various valves used in the present invention are well known in the art to those of skill.

Preferably, as shown in FIG. 2, inlet orifices 72, 74 of the flow directing means 70 are opposing check valves each enabling fluid flow toward the other, the outlet orifice 76 positioned between the check valves.

Preferably, the spent fluid 40 enters the spent fluid container 30 through an inlet port 32 positioned in the bottom of the spent fluid container 30, and the air displaced within the container 30 is forced out of an outlet port 34 positioned at the top of the spent fluid container 30 as shown by arrows.

Preferably, the new fluid 60 exits the new fluid container 50 through an outlet port 52 positioned in the bottom of the new fluid container 50, and the air from container 30 is forced into an inlet port 54 positioned at the top of the new fluid container 50.

Preferably, a check valve 75 is positioned in the transfer line 98, the check valve enabled by its orientation and function, as is well known in the art, for allowing fluid flow from the spent fluid container 30 to the new fluid container 50, but preventing fluid flow in the reverse direction. In this case the fluid flow is that of air and not any of the transmission fluids.

Preferably, an inlet valve 35 is engaged in the transfer line 98 near the outlet port 34 of the spent fluid container 30. This valve 35 provides a nipple 35' and acts with two-way actuation enabling air exchange between the containers 30, 50 as described above, and also alternately enabling compressed air to be injected into the containers 30, 50. The apparatus preferably further comprises a pair of drain valves 31 and 51, one of the drain valves 31 engaged with the spent fluid line 94 and enabled for draining the spent fluid 40 from the spent fluid container 30, the other of the drain valves 51 engaged with the new fluid line 96 and enabled for draining the new fluid 60 from the new fluid container 50.

The present invention provides a method, using the above apparatus, for replacing transmission fluid as previously described. As defined above, the method includes inserting the flow directing means 70 into either the cooler return line 90 of the fluid cooler 20 or the transmission return line 92 of the transmission 10 with the dual inlet orifices 72, 74 receiving the spent fluid and the outlet orifice 76 of the flow directing means 70 interconnected with the spent fluid container 30 so it can receive the spent fluid 40, interconnecting the new fluid line 96 between the new fluid container 50 which holds the new fluid 60, and the sealing means 80. Further, the method includes interconnecting the transfer fluid line 98 between the spent and the new fluid containers 30, 50, directing spent fluid 40 from the transmission 10 or from the fluid cooler 20 to the flow directing means 70 by operating the converter of the transmission 10, directing the spent fluid 40 from the flow directing means 70 to the spent fluid container 30, directing air from the spent fluid container 30 displaced by the spent fluid 40 entering the container 30, into the new fluid container 50 through the transfer fluid line 98, and directing the new fluid 50 from the new fluid container 50 through the new fluid line 96 into the dipstick tube 12 of the transmission 10 for replenishing the spent fluid 40.

Preferably, the method includes the step of sealing the new fluid line 96 in the dipstick tube 12.

Preferably, the method includes the step of providing opposing check valves in the flow directing means 70 thereby enabling fluid flow from either one of the check valves toward the other one of the check valves; and positioning the outlet orifice 76 between the check valves for receiving flow from either one of the check valves.

Preferably, the method includes the step of receiving the spent fluid 40 into the spent fluid container 30 through an inlet port 32 positioned at the bottom of the spent fluid container 30 and forcing displaced air out of an outlet port 34 positioned at the top of the spent fluid container 30.

Preferably, the method includes the step of receiving the air into the new fluid container 50 through an inlet port 54 positioned at the top of the new fluid container 50 and forcing the new fluid 60 out of an outlet port 52 positioned at the bottom of the new fluid container 50.

Preferably, the method includes the step of placing the transfer check valve 75 in the transfer line 98, and enabling the transfer check valve 75 for preventing fluid flow from the new fluid container 50 to the spent fluid container 30.

Preferably, the method includes the step of placing the inlet valve 35 in the transfer line 98 and directing compressed air through the inlet valve 35 and into the spent fluid container 30 and the new fluid container 50 to force fluids therein to drain therefrom. The method includes the step of placing the pair of drain valves 31, 51 and engaging one of the drain valves 31 with the spent fluid line 94 thereby draining the spent fluid 40 from the spent fluid container 30; and engaging the other of the drain valves 51 with the new fluid line 96 thereby draining excess new fluid 60 from the new fluid container 50 as needed.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An apparatus for replacing transmission fluid comprising in combination: a transmission interconnected with a spent fluid container for receiving a spent fluid from the transmission and a new fluid container for holding a new transmission fluid; a means for sealing within a dipstick tube of the transmission, the sealing means providing a sealing means aperture enabling fluid flow therethrough; a spent fluid line interconnected between the transmission and the spent fluid container; a new fluid line interconnected between the new fluid container and the sealing means; and a transfer fluid line interconnected between the spent and the new fluid containers; enabled so that spent fluid from the transmission is forced directly to the spent fluid container, forcing air from the spent fluid container into the new fluid container and forcing new fluid from the new fluid container into the transmission through the sealing means, the apparatus enabled by sealed closure for developing suction at the sealing means so as to further urge new fluid into the dipstick tube from the new fluid line.

2. The apparatus of claim 1 further comprising a means for directing fluid flow, the flow directing means providing two inlet orifices and an outlet orifice, the flow directing means enabled for receiving fluid through either one of the inlet orifices, while discharging the fluid through the outlet orifice, and further while checking fluid flow through the other of the inlet orifices, the flow directing means conducting fluid from the transmission to the spent fluid container.

3. The apparatus of claim 2 wherein the flow directing means provides opposing check valves each enabling fluid flow toward the other, the outlet orifice positioned between the check valves.

4. The apparatus of claim 1 wherein the spent fluid enters the spent fluid container through an inlet port positioned in the bottom of the spent fluid container, and the air is forced out of an outlet port positioned at the top of the spent fluid container.

5. The apparatus of claim 1 wherein the new fluid exits the new fluid container through an outlet port positioned in the bottom of the new fluid container, and the air is forced into an inlet port positioned at the top of the new fluid container.

6. The apparatus of claim 1 further comprising a transfer check valve in the transfer line, the transfer check valve positioned for preventing fluid flow from the new fluid container to the spent fluid container.

7. The apparatus of claim 1 further comprising an inlet valve in the transfer line, the inlet valve enabled for directing compressed air into the spent fluid container and the new fluid container for draining thereof.

8. The apparatus of claim 7 further comprising a pair of drain valves, one of the drain valves engaged with the spent fluid line and enabled for draining the spent fluid from the spent fluid container, the other of the drain valves engaged with the new fluid line and enabled for draining the new fluid from the new fluid container.

9. A method for replacing transmission fluid comprising the steps of: interconnecting a transmission with a spent fluid container for receiving a spent fluid from the transmission; interconnecting a new fluid line between a new fluid container holding a new fluid, and a sealing means in a dipstick tube of the transmission; interconnecting a transfer fluid line between the spent and the new fluid containers; directing spent fluid from the transmission to spent fluid container; directing air from the spent fluid container displaced by the spent fluid, into the new fluid container through the transfer fluid line; and directing new fluid from the new fluid container through the new fluid line into the dipstick tube of the transmission for replenishing the spent fluid.

10. The method of claim 9 further comprising the steps of providing a flow directing means with dual inlet orifices; inserting the flow directing means into a cooling line of the transmission.

11. The method of claim 10 further comprising the step of providing opposing check valves in the flow directing means; enabling fluid flow from either one of the check valves toward the other one of the check valves; and positioning the outlet orifice between the check valves for receiving flow from either one of the check valves.

12. The method of claim 9 further comprising the step of sealing the new fluid line in the dipstick tube.

13. The method of claim 9 further comprising the step of receiving the spent fluid into the spent fluid container through an inlet port positioned at the bottom of the spent fluid container; and forcing the air out of an outlet port positioned at the top of the spent fluid container.

14. The method of claim 9 further comprising the step of receiving the air into the new fluid container through an inlet port positioned at the top of the new fluid container; and forcing the new fluid out of an outlet port positioned at the bottom of the new fluid container.

15. The method of claim 9 further comprising the step of placing a transfer check valve in the transfer line, and enabling the check valve for preventing fluid flow from the new fluid container to the spent fluid container.

16. The method of claim 9 further comprising the step of placing an inlet valve in the transfer line and directing compressed air through the inlet valve and into the spent fluid container and the new fluid container.

17. The method of claim 16 further comprising the steps of placing a pair of drain valves, engaging one of the drain valves with the spent fluid line thereby draining the spent fluid from the spent fluid container and engaging the other of the drain valves with the new fluid line thereby draining the new fluid from the new fluid container.

* * * * *